United States Patent
Miller et al.

(10) Patent No.: US 9,421,698 B2
(45) Date of Patent: Aug. 23, 2016

(54) MASTERLESS LAYUP MANDREL TOOL

(75) Inventors: Jeffrey L. Miller, Mukilteo, WA (US); Michael J. Louderback, Mission Viejo, CA (US)

(73) Assignee: The Boeing Company, Chicago, IL (US)

( * ) Notice: Subject to any disclaimer, the term of this patent is extended or adjusted under 35 U.S.C. 154(b) by 73 days.

(21) Appl. No.: 13/291,084

(22) Filed: Nov. 7, 2011

(65) Prior Publication Data
US 2013/0014888 A1    Jan. 17, 2013

Related U.S. Application Data

(60) Provisional application No. 61/507,115, filed on Jul. 12, 2011.

(51) Int. Cl.
| | |
|---|---|
| *B29C 70/30* | (2006.01) |
| *B29C 33/00* | (2006.01) |
| *B29C 33/30* | (2006.01) |
| *B29C 33/38* | (2006.01) |

(52) U.S. Cl.
CPC ........... *B29C 33/0011* (2013.01); *B29C 33/307* (2013.01); *B29C 33/3828* (2013.01); *B29C 70/30* (2013.01); *Y10T 156/1052* (2015.01); *Y10T 156/14* (2015.01)

(58) Field of Classification Search
CPC .................................................. B29C 33/3842
USPC .................. 264/39, 219, 220, 257, 258, 203; 249/203; 156/169, 173, 175, 155, 154
See application file for complete search history.

(56) References Cited

U.S. PATENT DOCUMENTS

| | | | | |
|---|---|---|---|---|
| 3,650,863 | A * | 3/1972 | Klinkosch | B29C 44/32 156/201 |
| 4,073,049 | A * | 2/1978 | Lint | 29/458 |
| 4,349,401 | A * | 9/1982 | Dahlberg | B29C 70/08 156/221 |
| 4,578,303 | A | 3/1986 | Kundinger | |
| 4,839,442 | A * | 6/1989 | Craig, Jr. | 528/422 |
| 4,863,663 | A | 9/1989 | Nico, Jr. et al. | |
| 4,867,922 | A * | 9/1989 | Zuccato | 264/40.1 |
| 5,340,423 | A * | 8/1994 | Jacaruso | B29C 33/3842 156/158 |
| 6,284,168 | B1 * | 9/2001 | Robinson | 264/40.1 |
| 6,763,794 | B1 * | 7/2004 | Torikai | F02B 77/005 123/192.1 |
| 7,963,039 | B2 | 6/2011 | Burnett et al. | |
| 7,968,021 | B2 | 6/2011 | Cleary, Jr. et al. | |
| 2001/0010140 | A1 * | 8/2001 | Ritter | E04C 2/044 52/649.1 |
| 2005/0168090 | A1 * | 8/2005 | Gould | H02K 17/16 310/159 |
| 2010/0032862 | A1 | 2/2010 | Micheaux | |

FOREIGN PATENT DOCUMENTS

| | | |
|---|---|---|
| EP | 0521813 B1 | 1/1993 |
| JP | H05-193025 A | 8/1993 |
| WO | 9850180 A1 | 11/1998 |
| WO | 0126869 A1 | 4/2001 |

OTHER PUBLICATIONS

Notice of Reasons for Rejection from Related Japanese Application No. JP2014-520290; report dated Feb. 23, 2016.

* cited by examiner

*Primary Examiner* — Scott W Dodds
(74) *Attorney, Agent, or Firm* — Miller, Matthias & Hull LLP

(57) ABSTRACT

A mandrel tool for layup of composite material comprises a composite face sheet for providing a layup surface for the composite material, and a cellular header board structure for supporting the face sheet.

19 Claims, 3 Drawing Sheets

MASTERLESS LAYUP MANDREL TOOL

This application claims the benefit of provisional application 61/507,115 filed Jul. 12, 2011.

BACKGROUND

Composites including plies of reinforcing fibers embedded in a matrix are highly desirable for their light weight and high strength. One example of a composite is carbon fiber reinforced plastic (CFRP), where the constituents include carbon fibers embedded in an epoxy matrix.

Fabrication of a composite part involves depositing reinforcing fibers on a tool surface of a layup mandrel tool. The fibers may be pre-impregnated with resin upon deposition ("prepregs"), or they may be dry and subsequently infused with resin. The resin-infused fibers or the pre-impregnated fibers are bagged and then cured.

Rapid fabrication of composite parts is desirable for a wide variety of reasons. Rapid fabrication may be used to prototype a part for an aircraft, automobile or other structure to provide a competitive assessment, trade study, or even working model. Rapid fabrication may be used to repair a product such as an aircraft, automobile, wind turbine or civil structure (e.g., a bridge component) and quickly return that product to useful service.

SUMMARY

According to an embodiment herein, a mandrel tool for layup of composite material comprises a composite face sheet for providing a layup surface for the composite material, and a cellular header board structure for supporting the face sheet.

According to another embodiment herein, a method of fabricating a layup mandrel tool comprises creating a cellular structure from header boards, filling the cellular structure with a foam-like material, machining the foam and the cellular structure to obtain a machined surface, and laying up and curing composite material on the machined surface to form a face sheet.

According to another embodiment herein, a method comprises designing a mandrel tool for layup and curing of a composite part, including selecting material, thickness and stiffness of header boards for the mandrel tool. The method further comprises fabricating the header boards according to the selected material, thickness and stiffness and assembling the header boards into a cellular structure; filling cells of the cellular structure with a foam-like material; machining the foam-like material and the cellular structure to obtain a machined surface; and laying up and curing composite material on the machined surface to form a face sheet.

DETAILED DESCRIPTION

Permanent molds are typically used for creating quantities of production layup mandrel tools for the fabrication of composite parts. In contrast, a layup mandrel tool herein is not formed with a permanent mold. Rather, a layup tool herein is masterless.

Figure 1:
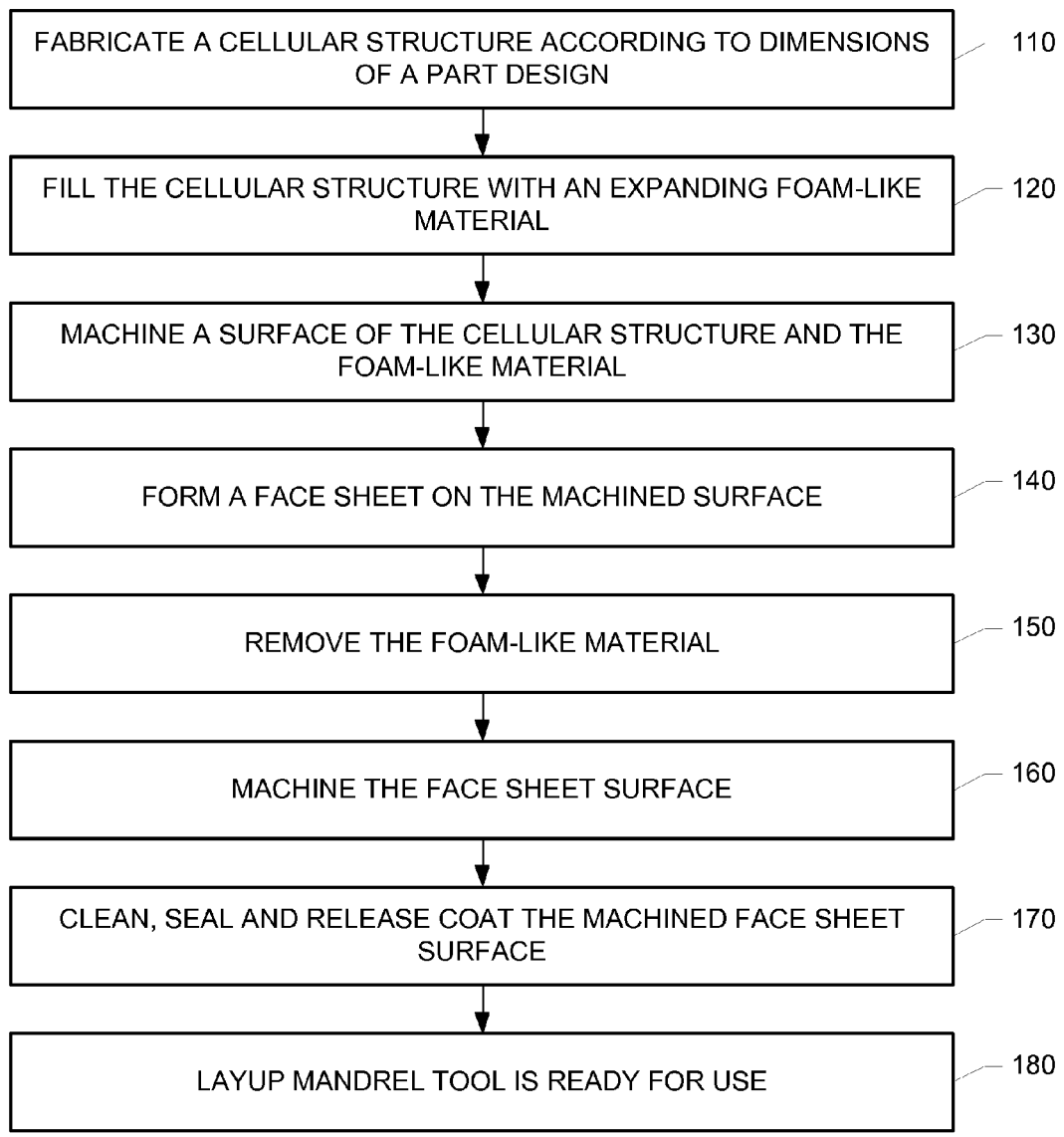
FIG. 1 is a method of fabricating a masterless layup mandrel tool.

Reference is made to FIG. 1, which illustrates a method of creating a masterless layup mandrel tool. At block 110, a cellular structure is fabricated according to dimensions of a part design. The cellular structure provides a billet that will encompass the overall tool and will include the rough contour and profile for the part. For certain parts, such as aircraft parts, this may be constant curvature or complex compound contour. The cellular structure may be formed from header boards. The material system, and density and thickness of the header boards may be tailored to a desired durability of the mandrel tool. Material systems may include, without limitation, epoxy and Bismaleimide (BMI). The header boards may be cut with a water jet, router, or other tool. They may be tied together by bonding, mechanical fastening, or both. Angles may be attached for additional reinforcement.

Figure 2A:
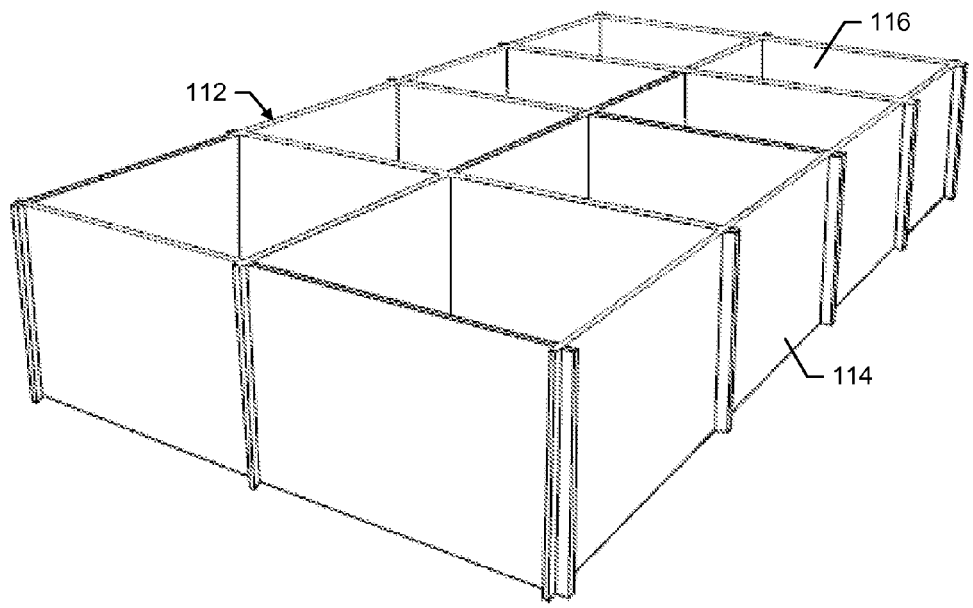
FIGS. 2A-2D are illustrations of a masterless layup mandrel tool during various stages of fabrication.

Additional reference is made to FIG. 2A, which illustrates an "egg crate" cellular structure 112. This cellular structure is formed from header boards 114, which define an array of open cells 116. The egg crate structure 112 is open at the top and bottom.

Figure 2B:
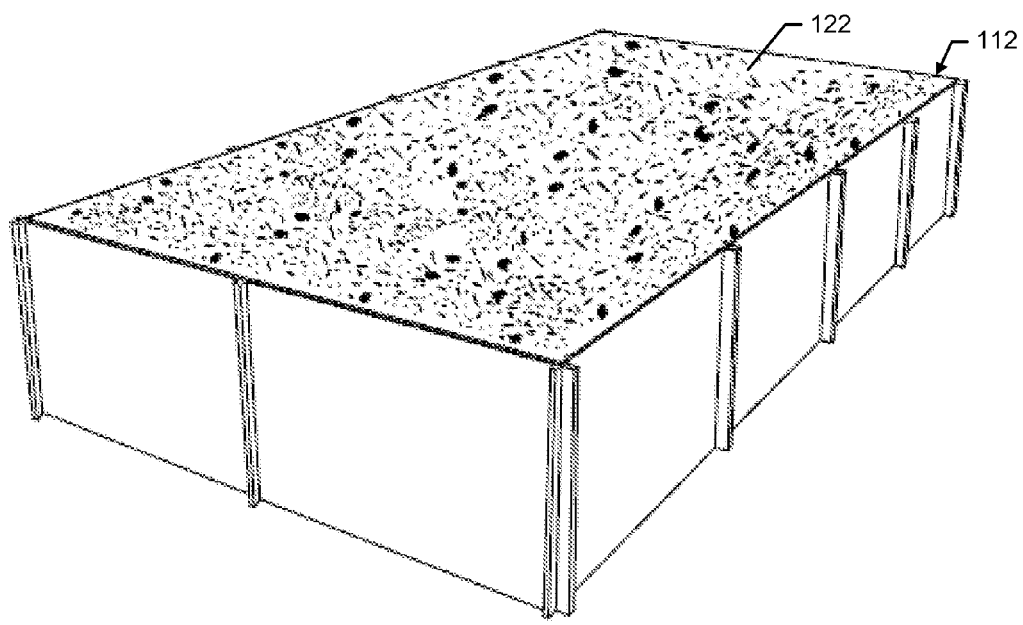

At block 120, the cellular structure 112 is filled with an expanding foam-like material 122 (see FIG. 2B). The foam-like material 122 maintains dimensional stability during processing conditions such as layup and curing. For instance, the foam-like material 122 should not degrade or shrink or expand at temperatures for resin infusion and curing, or prepreg curing. The foam-like material 122 should not degrade or shrink or expand at these temperatures. Similarly, the foam-like material 122 should not distort under pressure during resin infusion or autoclave pressure of curing prepregs. Dimensional stability and compressive strength requirements should be maintained so that a face sheet, which is subsequently formed on the cellular structure 112, is cured in a predictable position. If dimensional stability of the foam-like material 122 is not achieved, additional material may be added to the face sheet. This is undesirable. For instance, if the face sheet is not in its desired location, some areas of the face sheet might be undercut (not cleaned up) and other areas might be overcut (too much material removed).

Examples of the foam-like material 122 include, but are not limited to, polyurethane, polyisocyanurate, carbon foam, ceramic, and autoclave aerated concrete. The foam-like material 122 may be in the form of blocks, or it may be poured and cured, or it may be added by some combination thereof. The foam-like material 122 may be sealed with compatible materials (e.g., parent resin or an alternative resin) to prevent excess adhesive from enter the foam-like material.

Figure 2C:
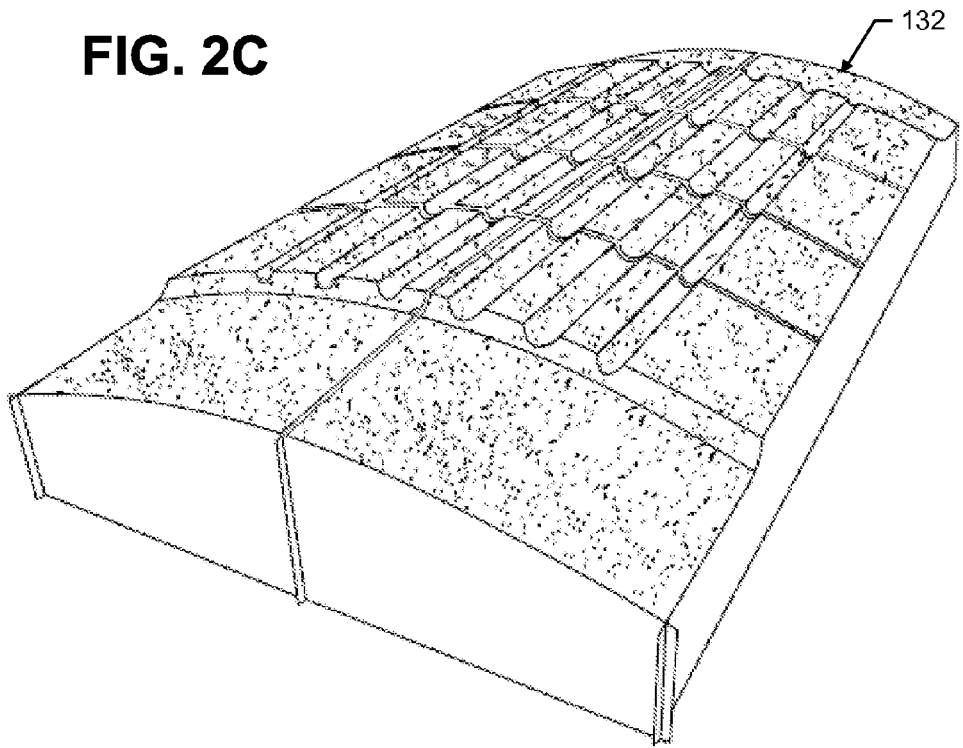

At block 130, the foam-like material 122 and the header boards 114 are machined to obtain a desired surface for layup of a face sheet. An example of the resulting machined surface 132 is illustrated in FIG. 2C.

At block 140, the face sheet is formed on the machined surface 132. Prior to forming the face sheet, however, an adhesive layer may be applied to the machined surface 132 to assist with bonding the face sheet to the header boards 114 and to keep resin from penetrating the foam-like material 122. The adhesive is preferably compatible with the parent resin and may be supported or unsupported.

The face sheet may be formed by placing fabric including reinforcing fibers on the adhesive layer. The fibers may be dry or they may be prepregs. If the fibers are dry, the dry fibers are subsequently infused with resin. This resin has been referred to as "parent" resin. The resin-infused fibers or the prepregs are then bagged and cured. The face sheet may be tied to the header boards by the combination of bonding and mechanical fastening. The mechanical fastening may be performed with clips or brackets.

At block 150, the foam-like material 122 may be removed from the cellular structure 112. For resin-infused fibers, the foam-like material 122 may be removed after resin infusion but prior to cure. For prepregs, the foam-like material 122 may be removed after cure. In some embodiments, the foam-like material 122 may be gouged and dug out from the back side of the cellular structure 112. In other embodiments, the foam-like material 122 may be removed in-tact as blocks.

In some embodiments, the foam-like material 122 may be removed completely from the cellular structure 112. In other embodiments, where the layup mandrel tool has a low profile, the foam-like material 122 may be left in the cellular structure 112, provided that it does not affect the quality of the part.

The foam-like material 122 may be removed to ensure that thermal requirements are met during curing (for instance, to ensure that heat is transferred through the back side of the tool). The foam-like material 122 is an insulator that can insulate the backside of the tool from a heat source, thereby interfering with the necessary temperatures in the required times as determined by the cure profile requirements. For tools having short header boards, the foam-like material may have a lower thermal impact and, consequently, may be left in place.

If blocks of the foam-like material 122 are removed intact, the blocks may be re-used. Reusing the blocks can reduce future costs and increase speed of manufacture. To enable in-tact removal, steps are taken prior to casting the foam-like material 122 in the cellular structure 112. For instance, the walls of the header boards 114 may be lined with slip sheets (sheets made of materials such as Teflon nylon, flouroelasomer), or they may be lined with release films, or other material that reduces the bond or coefficient of friction between the foam-like material 122 and the header boards 114. In addition, draft angles in the cellular structure 112 may facilitate removal as an angle may improve the ease by which the foam-like material 122 is pulled out.

At block 160, the exposed surface of the face sheet is machined and sanded and benched to a final profile. The final machining assures tolerances that are ordinarily difficult to attain with typical master tool castings. Final face sheet thickness is a function of durability of the tool and stress loads imparted to the tool. If minimum final thickness of 0.25" will ensure durability, then an initial thickness (e.g., 1 inch) is sized accordingly to allow machining to this final thickness. The machining may be performed on a milling machine. The sanding may impart a desired aero-quality surface finish to the mold line surface.

The machined face sheet surface may form an inner or outer mold line surface of the part, depending on the intended application of the composite part. Tool sides of the composite part typically have a better surface finish than bag sides of the panel unless a caul sheet is used to create a better surface finish on the bag side of the part.

At block 170, the machined face sheet surface may then be cleaned, sealed and release-coated. The sealing fills any small voids, and the release coating provides a non-stick treatment so the cured part can be removed from the tool without binding.

Figure 2D:
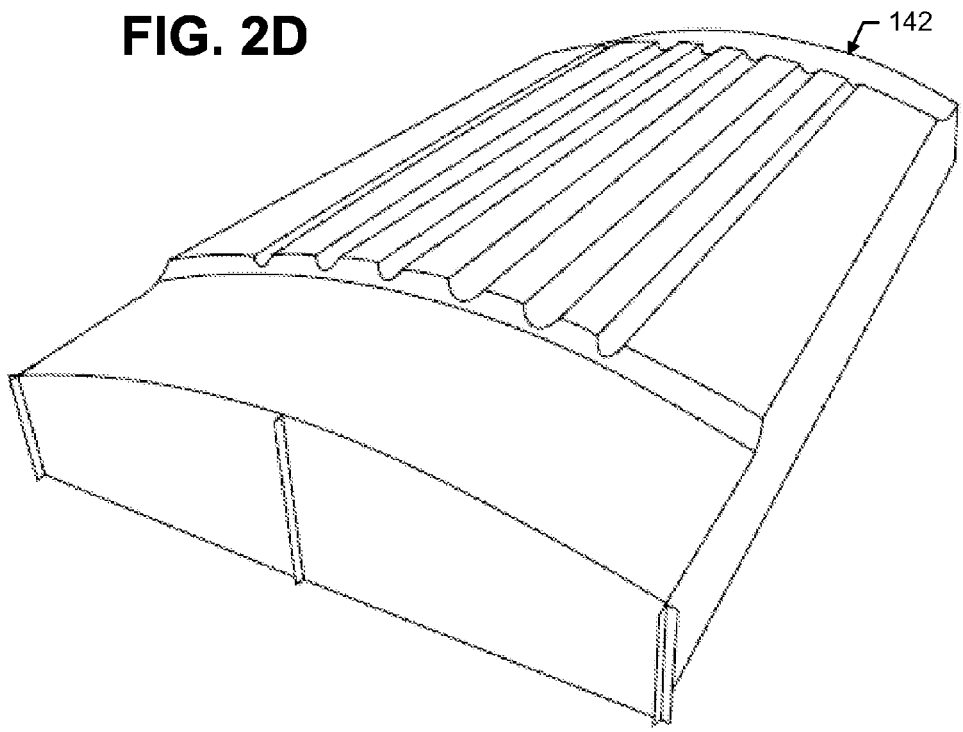

Additional reference is made to FIG. 2D, which illustrates an example of a layup mandrel tool including a machined face sheet 142. The face sheet 142 is co-bonded to the header boards 114. The header boards 114 provide integral stiffening to the face sheet 142, enable attachment to substructure for high profile tools, and provide a basic leveling system for low-profile tools (use as-is). The integral stiffening is valuable for larger face sheets 142, which become more "flimsy" as the face sheet area becomes larger. The integral stiffening also increases rigidity of the face sheet 142.

At block 180, the layup mandrel tool is ready for use. In some embodiments, the tool alone may be used to fabricate composite parts.

In other embodiments, the mandrel tool may be a section of a larger mandrel tool system. The mandrel tool system may be formed by assembling together a plurality of sections. A vacuum seal plane may be used between sections to ensure vacuum integrity across the entire mandrel tool system. If a section needs to be shipped from fabrication site to a layup site, it may be advantageous to assemble the sections at the layup site to avoid the cost and delays of oversize load shipping.

A high profile tool (generally greater than approximately 24 inches in height) may use a substructure to reduce the height of the header boards, and volume of foam-like material. The substructure may support the tool above a floor or a cart without sacrificing tool stiffness. In contrast, a low profile tool may be used "as is" with relatively short header boards for panel production without the need for any additional substructure to support the tool from the floor or a cart.

Thus disclosed is a method of fabricating a layup mandrel tool rapidly. By simply changing a few parameters (header board density and thickness, face sheet thickness, and material system), the same architecture can be used to build layup mandrel tools for different purposes. Some tools may be used to fabricate custom replacement parts. Other tools may be used to fabricate parts for limited use prototypes. Still other tools may be used for multiple production runs.

Durability of the masterless tool may be increased so it can be used for more expensive "production" or higher run parts. The durability may be increased by increasing the thickness of the face sheet, increasing stiffness and thickness of the header boards. Header board stiffness may be increased by reducing the spacing between header boards. Durability may also be increased by selecting a more durable material for the header boards. For instance, BMI is more durable than epoxy. Epoxy materials are preferred for production cycles up to 250 F and up to over 100 cycles, and up to 10 runs for 350 F. A material such as BMI is preferred for cycles requirements greater then 350 F and 10 runs.

Increasing any or all of these parameters will increase the cost of the masterless tool, but will provide a masterless tool that can be used for more cure cycles or runs. Parts having limited production cycles may use less tie material (e.g., 50% or less), and greater spacing of header boards. More durable tools may have 100% tie attachment, for both header board to header board, and also face sheet to header board.

In some embodiments, a masterless tool herein may be used as a master for fabricating production tools. By adjusting certain parameters, masters may be made as an alternative to conventional invar, steel, etc. (masters may be used to produce standard composite tools) A master herein may be produced in significant shorter time than a steel or invar tool (e.g., 50% shorter). This would significantly reduce the lead times for final more conventional composite tools requiring masters.

A masterless layup mandrel tool herein is not limited to any particular type of part. Examples of composite parts include, without limitation, wing panels, cargo door panels, automobile hoods and panels, truck hoods and panels, panels for a composite tank, and composite domes. Some of these parts may have complex contoured surfaces.

The invention claimed is:

1. A method comprising fabricating a masterless layup mandrel tool for laying up and curing a fiber-reinforced composite part, wherein fabricating the layup mandrel tool includes:
   creating a cellular structure from header boards;
   filling the cellular structure with a foam-like material;
   forming a fiber-reinforced composite face sheet on the filled cellular structure, including machining to alter the shape of the foam-like material and the cellular structure of the filled cellular structure to obtain a desired surface for layup, laying up fabric having reinforcing fibers and resin on the desired surface, and curing the fabric and resin; and
   machining an exposed surface of the face sheet to form a layup surface.

2. The method of claim 1, further comprising cleaning, sealing and release coating the machined face sheet surface.

3. The method of claim 1, wherein the cellular structure is an egg crate cellular structure.

4. The method of claim 1, wherein the header boards are made of an epoxy resin.

5. The method of claim 1, wherein the header boards are made of Bismaleimide.

6. The method of claim 1, wherein the face sheet has a complex contour surface.

7. The method of claim 1, wherein the cellular structure includes a grid of empty cells.

8. The method of claim 1, wherein the header boards are configured to release the foam-like material as blocks.

9. The method of claim 1, wherein the foam-like material is removed from the cellular structure as blocks.

10. The method of claim 1, wherein filling the cellular structure includes using previously-used blocks of foam-like material.

11. The method of claim 1, wherein the face sheet is bonded to the cellular structure.

12. The method of claim 1, further comprising:
   forming a resin-impregnated carbon fiber layup of the part on the tool;
   bagging the layup; and
   curing the layup on the tool.

13. The method of claim 1, wherein the foam-like material includes autoclave aerated concrete.

14. The method of claim 1, wherein the foam-like material includes ceramic.

15. The method of claim 1, wherein the foam-like material includes carbon foam.

16. The method of claim 1, wherein the foam-like material includes polyisocyanurate.

17. The method of claim 1, wherein the foam-like material includes polyurethane.

18. A method comprising fabricating a layup mandrel tool for laying up and curing a fiber-reinforced composite part, wherein fabricating the layup mandrel tool includes
   creating an egg crate cellular structure from header boards;
   filling the cellular structure with a material of one of polyurethane, polyisocyanurate, carbon foam, ceramic, and autoclave aerated concrete;
   forming a fiber-reinforced composite face sheet on the filled cellular structure, including machining to alter the shape of the material filling and the cellular structure to obtain a desired surface for layup, laying up and curing fabric having reinforcing fibers on the desired surface; and
   machining an exposed surface of the face sheet to form a layup surface.

19. The method of claim 18, further comprising:
   forming a resin-impregnated carbon fiber layup of the part on the tool;
   bagging the layup; and
   curing the layup on the tool.

* * * * *